July 1, 1947.                C. E. SLAUGHTER                 2,423,260
                              EXTRUSION OF TUBING
                            Filed Dec. 29, 1944              2 Sheets-Sheet 1
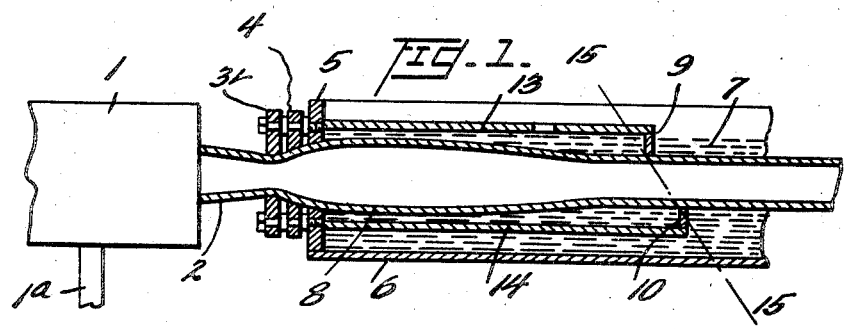
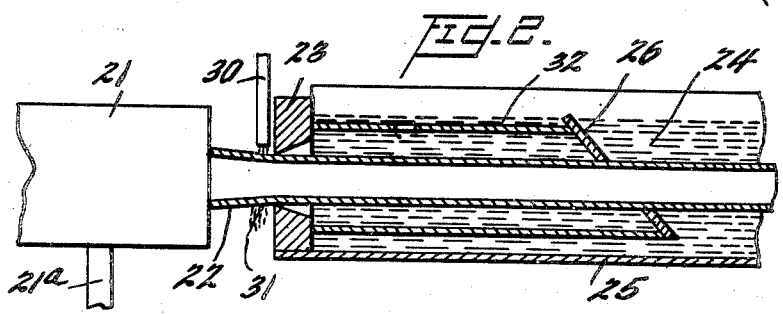
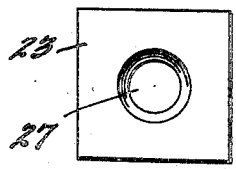 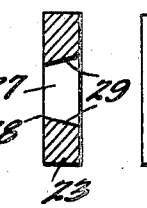 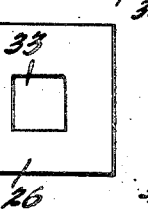 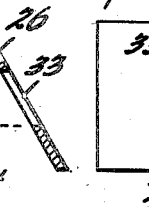 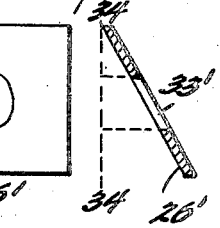
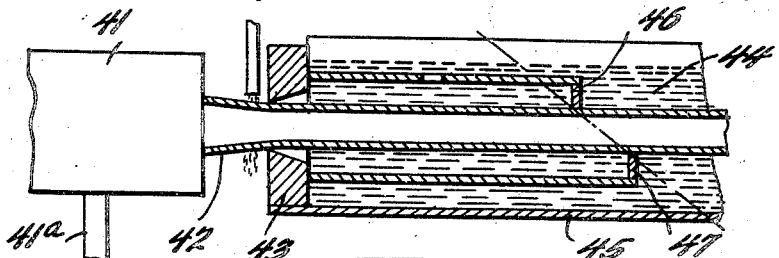
Inventor
Charles E. Slaughter,
By Sol Shappirio
Attorney July 1, 1947.  C. E. SLAUGHTER  2,423,260
EXTRUSION OF TUBING
Filed Dec. 29, 1944  2 Sheets-Sheet 2
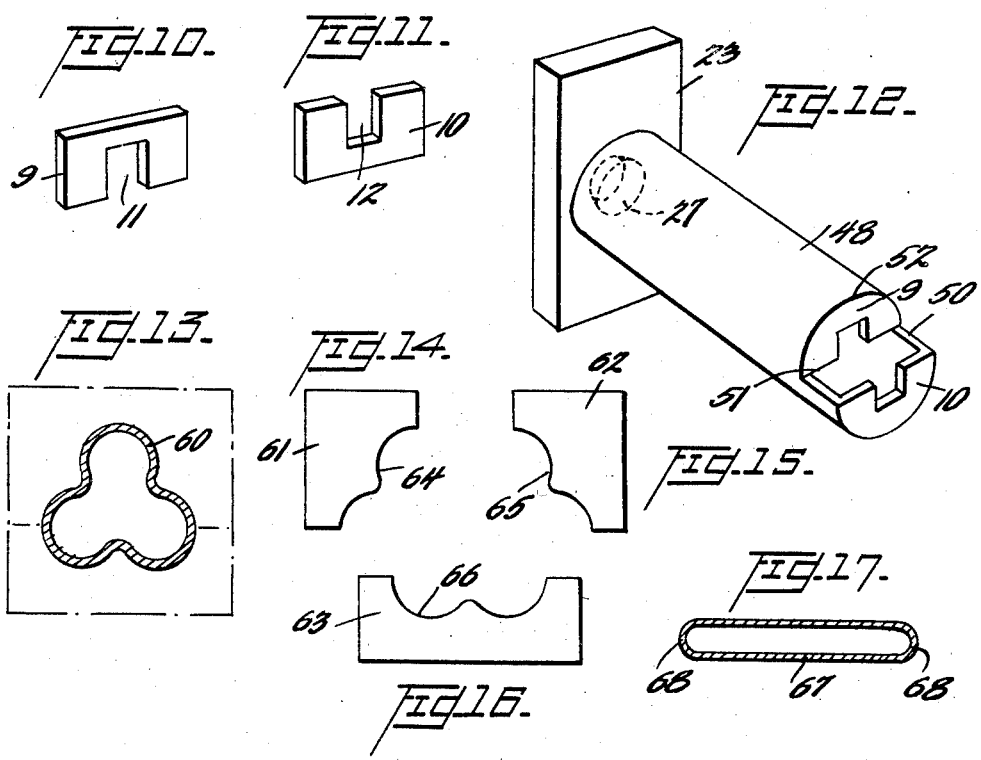
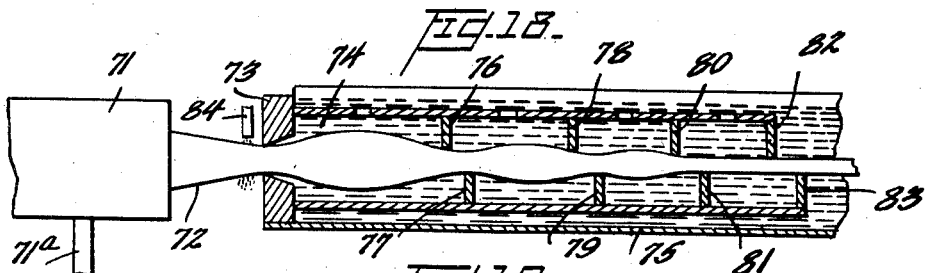
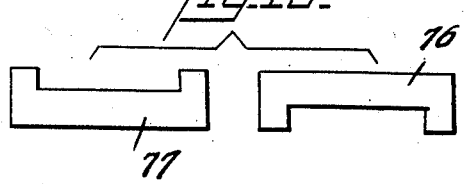
Inventor
Charles E. Slaughter,
By  Sol Sheppirio
Attorney Patented July 1, 1947

2,423,260

UNITED STATES PATENT OFFICE 2,423,260

EXTRUSION OF TUBING

Charles E. Slaughter, New Canaan, Conn., assignor to Extruded Plastics, Inc., Norwalk, Conn., a corporation of Connecticut Application December 29, 1944, Serial No. 570,371

17 Claims. (Cl. 18—14)

This invention relates to the production of tubing, particularly by extrusion methods and to apparatus and instrumentalities utilized in such methods.

Difficulties are experienced in the extrusion of thermoplastic tubing. In the extrusion of tubing from thermoplastics, the heated material is ordinarily expressed through a die member having an orifice of the precise shape of the tubing it is desired to produce. Fluid pressure, such as air, is introduced into the tube through a cross-head to prevent the tubing from collapsing internally, since the tubing is not self-supporting at the time of extrusion and does not become self-sustaining until cooled, the wall thickness of the tubing being sufficient to be self-sustaining when cooled. It is fairly common practice to extrude the tubing downwardly into a cooling medium whereby it is chilled quickly to set it before it has a chance to deform materially, but extrusion directly into water or similar coolant causes enormous uncontrolled shrinkages. Further it is not possible to produce tubing in this way of the degree of tolerance necessary and it is not only out of round frequently but of varying wall thickness. Nor is it possible by such methods to produce tubing of any substantial size such as ⅛ inch internal diameter or larger, which does not vary in cross-section along its length substantially beyond the tolerances permitted in better practice.

Among the objects of the present invention is the production of tubing by extrusion which is of substantially uniform character.

Other objects include apparatus, machines, and instrumentalities for the production of substantially uniform tubing by extrusion methods.

Still further objects and advantages of the present invention will appear from the more detailed description set forth below, it being understood that such detailed description is given by way of illustration only, and not by way of limitation, since various changes therein may be made by those skilled in the art without departing from the scope and spirit of the present invention.

This application is a continuation-in-part of application Serial No. 458,051, filed September 11, 1942, entitled "Fabrication of tubing," and of application Serial No. 488,458, filed May 25, 1943, entitled "Thermoplastic extrusion."

In connection with that more detailed description set forth below, there is shown in the accompanying drawings, in Figure 1, a side sectional elevation illustrating apparatus that may be used in the present invention; in Figure 2, a side sectional elevation of a modified form of apparatus; in Figure 3, a front elevation of a draw plate used to control the contour of the extruded tubing; in Figure 4, a central section through the draw plate of Figure 3; in Figure 5, a front elevation of the final draw plate; in Figure 6, a section through the plate of Figure 5; in Figure 7, a front elevation of a modified form of final draw plate; in Figure 8, a section through the plate of Figure 7; in Figure 9, a further modification of apparatus that may be utilized in the extrusion processes of the present invention; in Figures 10 and 11, front elevational views of partial draw plates used in the final shaping of tubing; in Figure 12, a unit structure assembly of preliminary draw plate and final partial draw plate; in Figure 13, a section through a clover leaf type of extruded tubing; in Figures 14, 15 and 16, front elevations of partial draw plates which conjointly give the clover leaf type of tubing; in Figure 17, a section through flat tubing; in Figure 18, a side sectional elevation illustrating a further modification; and in Figure 19, one set of a modified form of final draw plates.

In accordance with the present invention, tubing is produced by expressing a heated thermoplastic for example, through a die to form a tube, while supporting the tube internally by introducing a fluid such as air thereinto, in the usual manner, but thereafter, the cross-sectional contour of the tube is controlled by drawing operations, such drawing operations desirably being carried out with draw plates having openings therein through which the extruded tubing passes, and which openings are of a size and contour to control the type of tubing desired. Various modifications of draw plates that can be used for particular purposes, and combinations of preliminary and final draw plates for these shaping operations, will be illustrated below.

Various types of materials may be extruded to produce controlled tubing in accordance with the present invention, and particularly thermoplastic materials best illustrated perhaps by the synthetic resinous materials. The materials used should be such as rigidify or set on cooling and may include compositions containing cellulose derivatives including the esters, particularly cellulose acetate, cellulose nitrate, cellulose acetate butyrate, and the cellulose ethers such as ethyl cellulose, benzyl cellulose, etc., vinyl polymers and copolymers, including polymerized vinyl acetate, and vinylidene chloride and copolymers of vinyl chloride and vinyl acetate, polymerized styrenes, methacrylate and methyl methacrylate resins, polyethylenes, nylon type resins, etc.

Generally the methods of the present invention and the machines or apparatus, are utilized for fabricating tubing from thermoplastics by steps which include extrusion of the thermoplastic tubing from a die in the form of a tube of any cross-section, as for example, having substantially circular cross-section and then drawing the extruded tubing into the ultimate final shape desired by the application of shaping pressures to the extruded tubing while it is still plastic enough to be shaped in this way.

Considering the apparatus shown in Figure 1, the extrusion die 1 having the cross head 1a for introduction of air extrudes the tubing 2 which then passes into the preliminary draw plates. One or more preliminary draw plates may be used, and in the showing of Figure 1, three such preliminary plates are shown 3, 4, 5, respectively. Such preliminary draw plates where a multiplicity are utilized may be grouped together as a unit, separated from each other by split spacing rings and held together by bolts. The plate 5 as illustrated may form the end of the container or receptacle 6 which carries the main body of coolant such as water 7. The water or other coolant may be supplied at a temperature of about 55° F. The tubing 2 somewhat expanded by the air or other fluid forced into the tubing through the cross head 1a, is received and drawn down in the first of the draw plates 3 and thereafter passes successively through similar shaped openings in each of the succeeding draw plates 3, 4 and 5. In the particular example shown in these preliminary draw plates, the openings through the set of draw plates 3, 4 and 5 may be said to constitute a frustum of a cone, the openings gradually increasing in size along a taper for example, at an angle of about 5°. Thus the tube 2 enters the opening in the preliminary draw plates at the point of least diameter of the frustum and effectively prevents cooling liquid from running away around the tubing through the opening in the first draw plate 3. At the same time, owing to the increase in diameter of the openings through the draw plates 3, 4 and 5, water flows from the receptacle 6 around the tubing and a film of water is interposed between the tubing and the metal of the draw plates. The split spacing rings referred to open at the top and bottom to permit water or other coolant being used to flow through the openings of those rings so that a steady flow of coolant is contacted with the relatively hot plastic entering the draw plates. With heavy walled tubing where it is desirable to conduct the heat away from the skin of the tubing sufficiently rapidly to keep the metal of the draw plates from heating up too much, a small amount of the coolant such as water may be permitted to bleed around the outside of the front plate through openings in those plates. The small or minimum amount of water which thus bleeds around the first plate is sufficient to produce shrinkage of the heavy walled plastic tubing to reduce the temperature of the skin of such tube before it enters the first plate 3. The lowering of temperature is sufficient to permit the usual film of water to remain between the metal of the plate and the plastic.

Sufficient air is introduced into the tubing 2 so that it is re-expanded somewhat after passing through the plates 3, 4 and 5. The tubing in somewhat expanded condition as illustrated at 8 is subject to the final shaping pressures. Instead of using a single final draw plate in this instance, the final shaping pressures are applied through final draw means which exert the shaping pressures against only a portion of the tube periphery at any one time, successive plates exerting such shaping pressure at different portions of the tube periphery, desirably there being a sufficient number of plates to exert the shaping pressures over the entire periphery of the tube by the time the tube has passed the last of these partial shaping plates. As illustrated in Figure 1, the final draw means through which the tube passes consists of partial plates illustrated in Figures 10 and 11 and indicated there as 9 and 10. Each of these plates is a half plate including half of the shaping portion desired in the final tubing. In this instance a square tube is to be made from the extruded round tube. The tube 2 in its expanded condition is first passed through the oblong opening 11 centrally located in the plate 9, this opening constituting the upper half of the shape of the final tubing desired, and the tube after leaving plate 9 then passes into the lower partial shaping plate 10 having the opening 12 therein in which the lower half portion of the tubing is shaped to the final square portion desired. It will be seen that the two plates 9 and 10 are complementary and conjointly subject the tubing successively to pressure to shape the tubing, each plate applying such shaping pressure against a portion of the tube periphery only, but the plates conjointly together contacting the entire periphery of the tubing by the time it has passed the last plate. These plates may be held in position by being attached to elements 13 and 14 respectively mounted on the front wall 5 of the container or receptacle 6. Referring to Figure 1, it will be seen that the tubing 2 as it passes into and through the plate 9 is contacted by such plate well in advance of the point of contact of plate 10 with the underside of the tubing. This is illustrated by the line 15—15 drawn through the points of contact of the tube with these plates respectively showing that such line of contact of the plates with opposite peripheral points of the tubing, forms an angle other than 90° with the line of draw. Thus one side of the tubing 2 is no longer in contact with a draw plate 9 when the opposite side of the tube contacts the draw plate 10. Suitable take-up means not shown, as for example, a large driven winding reel may be provided to receive the tubing as it emerges from the end of the cooling receptacle 6, in which it is immersed after receiving the initial cooling treatment referred to above, or the tubing may be cooled down sufficiently and then removed from the container as it is being extruded and shaped, and cut into standard lengths of 8, 10 or 12 feet. If desired the final draw plate and the initial draw plate can be associated into a unit or jig or entity as will be described below in connection with Figure 12, or they may be separately mounted. While a plurality of draw plates is shown as preliminary drawing operations in Figure 1, a single initial draw plate may be employed as illustrated below in connection with other figures; and also instead of using the partial plate final draw means, a single angularly positioned final draw plate may be employed which will also be illustrated in connection with other modifications below.

The example and explanation of the apparatus of Figure 1 as given above illustrates the number of factors that enter into the application of coolant in order to produce uniform, strain-free products. For example, it is important to contact the entire periphery of the extruded tubing or similar section, while still very hot, with a coolant so that there is simultaneous application of coolant to the entire periphery of the tubing. This results in uniform shrinkage and avoidance of strain internally in the section. It is also desirable to maintain a thin film of fluid coolant, whether in liquid or gaseous form, between the draw plates and the tubing being drawn or expressed therethrough. The presence of such film may be readily provided for by flaring or tapering the plates at the openings through which the section is drawn, and the presence of liquid not only insures simultaneous application of coolant to the entire periphery of the tubing or other section, but prevents seizing between the plastic and the material of the plates, usually metal. The plastic as it enters the first plate will generally be at a temperature of about 400° F. or possibly as low as 325° F. for some plastics or resins. This heat is sufficient to form a layer of steam between the plate and the plastic.

In connection with the extrusion of sections of the character of tubing, it is important also, to have the tubing pass through a final plate set at other than a right angle to the line of draw in order to prevent any seizure at this point. That is, the final drawing operation should be carried out by exerting the shaping pressures so that one side of the tubing is no longer in contact with the partial draw plate if a partial draw plate is used, or the upper portion of an angularly placed single final draw plate, when the opposite side of the tube contacts either the next portion of the final draw plate or of the bottom portion of the single draw plate when the latter is used. The temperature of the tubing or other section at the instant it passes through the final draw plate and the rate of travel of the tube are important factors entering into the production of the desired shape of uniform section. The tubing or other section must be hard enough at this point to hold to shape as it emerges from the final draw plate but it must be plastic enough as it enters the plate so that it can be shaped to the final form desired. It emerges from this final draw means in a practically rigid state or almost rigid state which it retains.

The distance between the final draw means 9, 10 and the initial draw means such as 3, 4, 5, or the distance between other preliminary and final draw means as illustrated below, is determined primarily by the type of plastic that is being fabricated into tubing. On very hard stock that sets rapidly as it enters the coolant, a length of about 4 inches between the preliminary and final draw means is satisfactory. For softer material or for a shape that requires adequate setting, as for instance, square tubing, the final draw means may be spaced 12 inches or up to 18 inches for example, from the preliminary draw means, since desirably the final drawing operation is carried through when the material has reached an almost rigid state.

A specific example illustrating the practice of the invention in the fabrication of tubing of ¾ inch outside diameter with a 1/16 inch thickness of wall will illustrate the invention. The tubing was made from a cellulose acetobutyrate plastic ("Tenite II"). This material was extruded at approximately 400° F. through an extrusion die with an annular orifice one inch in outside diameter and with a wall thickness of seventy thousandths of an inch. Sufficient air was introduced into the tubing to expand it to an outside diameter of about one and one-eighth inches. The tubing was pulled into a preliminary draw plate having a circular opening of eighty hundredths of an inch diameter at the point of entry of the tubing. Three preliminary draw plates were used, spaced apart about twenty thousandths of an inch. The openings in the three plates were arranged in the line of draw and were gradually enlarged at an angle of 5° from the point of entry of the tubing into the first draw plate to the point of its exit through the three preliminary draw plates. The air pressure in the tubing was sufficient to enlarge it slightly after it emerged from the third draw plate and the enlarged tubing was then drawn through a plate set at an angle of 45° to the line of draw. The opening in its final draw plate was exactly ¾ inch in diameter, in the line of draw. The tubing was extruded at a rate of 50 pounds per hour and was drawn through the final draw plate at a speed of about 14 feet per minute. In this manner thousands of feet of tubing have been drawn which were not measurably out-of-round and which varied in diameter less than one-half of one per cent.

In the form of apparatus shown in Figure 2, there is illustrated the use of single preliminary draw plate and a final draw plate placed at an angle other than 90° to the line of draw, the single draw plate illustrated as the preliminary draw plate being particularly useful in connection with the extrusion of tubing. As there shown, the extrusion die 21 with the cross head air inlet 21a extrudes the tubing 22 through the draw plate 23 from which it passes into the coolant 24 in container or receiver 25 and finally out through the final draw plate 26. This apparatus illustrates the use of a single draw plate instead of a plurality of draw plates, and particularly a single draw plate of specific characteristics that is very valuable in the shaping of tubing. As shown in Figures 3 and 4 specifically, the draw plate 23 is formed with the opening 27 through which the tubing 22 passes. This draw plate 23 is provided with a sharp leading edge 28 formed by tapering the walls forming the opening 27 as indicated at 29. The angle of taper need not be very large and may be for example, from 5° to 10° from the horizontal. This sharp leading edge or knife edge which is the first contact of the extruded tubing 22 with the preliminary draw plate 23, has been found eminently successful in producing closer tolerances than is possible when two or more draw plates are employed.

In the utilization of the machine of Figure 2, it has been found that on heavy tubings and also on very thin walled tubings that travel at high speeds, a considerable amount of heat may be generated at the sharp leading edge depending on the type of plastic being extruded. To prevent overheating in any case, as for example, in the case of cellulose acetate butyrate being extruded, it is desirable to cool off the resin with a minimum or samllest possible stream of water in front of the draw plate in order to keep the draw plate cool. This is done by the coolant for this purpose being supplied through a pipe or other device 30 which applies a minimum stream of coolant 31 at the point indicated to prevent overheating.

The preliminary draw plate 23 may be attached in any way to the receptacle or container 25 and may as illustrated, form the front wall of such container. The final draw plate 26 may be carried in position in any desired way as by a cylinder shown in section at 32 in Figure 2 which is carried on the front wall of the container 25, or the preliminary draw plate 23 and final draw plate 26 may form an entity with the cylinder 32 and both positioned and held in place on such a cylindrical mounting and attached in any desired way to the front wall of the container 25.

As has been pointed out above, when a single final draw plate like 26 is employed, it is important that such final draw plate be set at other than a right angle to the line of the draw of the tubing 22, in such manner that one side of the tubing 22 is no longer in contact with the draw plate 26 when the opposite side of the tubing contacts the final draw plate. The angle at which the final draw plate is set with respect to the line of draw may vary since it is only necessary that the tubing be subjected to force on one side before being contacted with the draw plate on the opposite side. Depending upon the thickness of the plate and the size of tubing being drawn, this angle may be from about 10° to about 80° but is preferably from 30° to 60°. Since the opening in the final draw plate 26 fixes the final desired shape of the tubing, and that plate is at an angle other than 90° with the line of draw, the opening in the draw plate 26 must be of such character that when projected on a plane at 90° to the line of draw, this opening will have substantially the exact contour to give the periphery desired in the tubing. As illustrated in Figures 5 and 6, the plate 26 carries an opening 33 which is utilized to produce the final square contour of the tubing from the initially drawn round tubing. Consequently the opening 33 in the plate is not itself square but is oblong and if projected on a plane 34—34 as shown in Figure 6, the opening 33 would in that plane show the exact square contour desired in the periphery of the tubing. The same considerations hold for any other shape which it is desired to make. Thus in Figures 7 and 8, a final draw plate 26' is illustrated having the opening 33' which is oval in the plate 26', but which opening projected on a vertical plane 34—34 as illustrated in Figure 8, would be an exact circle of a contour fixing the desired periphery of the tubing. In this way any desired cross-sectional shape may be given to tubing by the choice of the final draw plate utilized, even though the initial drawing operation and extrusion is of a circular cross-section or annular cross-sectional tube. Thus the invention is not restricted to tube or tubing of circular section. Any desired section may be produced, as for example, tubing of square, triangular, hexagonal, or any other desired cross section. Thus square tubing ¾ inch on a side with a 1/16 inch wall of uniform cross-section may be produced from tubing initially extruded from a die having a circular or annular orifice and then drawn through plates to produce the square tubing. The production of tubing of polygonal cross-section from extruded annular tubing is of great advantage since it eliminates the necessity for having special extrustion dies for each shape of tubing desired, avoids the disadvantage of expense of such a multiplicity of dies, and also by the operations of the present invention a much more efficacious control of the shaping operations is carried forward.

In the device of Figure 2, a single preliminary draw plate has been illustrated utilized in conjunction with a single final draw plate. For some purposes it is possible to utilize the single preliminary draw plate illustrated in Figure 2 without any final draw plate but the combination is most desirably used as illustrated. Any final draw means may be employed and this is illustrated in connection with the apparatus of Figure 9.

In Figure 9, extrusion apparatus is shown which utilizes the single preliminary draw plate of Figure 2 with the final draw means of Figure 1. As there shown, the extrusion die 41 provided with the air inlet cross head 41a extrudes the thermoplastic tubing 42 which enters into the preliminary draw plate 43 that is identical with the draw plate 23 of Figure 2 and passes through such draw plate 43 into the coolant 44 contained in the container or receptacle 45. The final draw means includes plates 46 and 47 similar to plates 9 and 10 of Figure 1, Figure 10 and Figure 11, the first partial plate 46 together with the second partial plate 47 successively applying shaping pressures to the tube 42 in the manner described above in connection with Figure 1, to convert the annular cross-sectional tubing 42 into square tubing.

It has been pointed out above that the preliminary draw plate and the final draw means may be joined together to form an entity or jig and this is illustrated in Figure 12 utilizing a draw plate 23 as the initial draw plate and final draw means 9 and 10 as shown in Figures 10 and 11. In this case the initial draw plate 23 having the knife edge and tapered opening 27 carries the cylindrical member 48 which is cut away as shown at 50 along a horizontal line inwardly to a point 51 and then upwardly to the point 52, and the partial plate 9 constituting part of the final draw means is attached to the adjacent portion of the cylinder 48, while the partial draw plate 10 constituting the other element of the final draw means is attached to the outer end of the cylinder 48 in the respective positions shown. These plates 9 and 10 act therefore as the final draw means and the whole is associated together into an entity or jig as illustrated. This enables easy manipulation, attachment and utilization of these draw means as an entity. The several parts may be made of metal and welded or otherwise attached together.

Draw means constituted by partial shaping plates which successively apply shaping pressure at different portions of the tube periphery and desirably conjointly contact the entire periphery of the tubing, are just as efficient as a single final draw plate and far easier to adjust. Any type of cross-sectional shape may be produced in this way and this may be further illustrated by a section of clover leaf cross-section as shown in Figure 13, the clover leaf pattern there being generally indicated as 60. In this case three partial final plates may be employed as shown in Figures 14, 15 and 16 and there denominated respectively 61, 62 and 63. It will be seen that each of these plates has a portion of the contours of the clover leaf pattern desired indicated respectively at 64, 65 and 66. These plates are positioned successively one after the other in the manner shown for the plates 9 and 10 in Figure 1 and exert a shaping pressure against the portion of the tube periphery which the individual plate contacts, the group of plates ultimately and conjointly contacting the entire periphery of the tubing and producing the final clover leaf cross-section indicated. If desired, only one or two of these plates may be used to give only a partial shaping operation, but desirably the plates are used conjointly and successively to give the shaping pressure and to produce the final design.

In the fabrication of relatively simple shapes such as tubing, round or oval in cross-section, it is possible to use even a single draw plate. Where more complicated shapes are to be produced, as illustrated for example in the clover leaf pattern of Figures 13–16, or in the production of flat tubing having curved side walls as illustrated in Figure 17, a final draw plate as shown in Figure 2 or a set of final draw plates as shown in Figures 1 and 9 is desirably employed in making such products within desired tolerances.

For high speed production on complicated shapes, however, speed of production may be greatly increased and the closest possible tolerance still maintained by using a multiplicity of sets of final draw plates. For example, in making flat tubing 67 with curved side walls 68 as shown in Figure 17, the apparatus of Figure 18 may desirably be used. As there shown, the extrusion die 71 with the cross head air inlet 71a extrudes the tubing 72 which then passes through the preliminary draw plate 73 of the type explained above in connection with Figures 3 and 4, although other types of preliminary draw plates may be used. The tubing 72 then passes into the coolant 74 in container 75, the forward wall of which may as shown, be the preliminary draw plate 73. The tubing then passes through a multiplicity of sets of draw plates 76—77, 78—79, 80—81, and 82—83 which sets may conveniently be equidistant from each other. Each set of such draw plates may as shown consist of a pair of draw plates 76, 77 as shown in Figure 19. They may be assembled into a unitary jig structure with the plate 73, analogous to that described above in Figure 12. Each draw plate exerts its predetermined shaping pressure, and conjointly complete the shaping operation. By the time the tubing passes through the last plate 83, it is just about permanently set. The use of a multiplicity of such draw plates markedly speeds up production in making tubing of any desired contour to very close tolerance.

In connection with the method and apparatus of Figures 18 and 19, the considerations with respect to coolant as set forth above, also apply, including the use of a restricted stream of coolant applied through pipe 84 immediately in front of draw plate 73.

The temperature of the coolant in the container or receiver which is the cooling liquid employed to set the plastic and the rate of draw of the tubing are interrelated functions which are desirably adjusted to give proper results. While water has been illustrated as a cooling liquid at a temperature for example, of 55° F., cooling liquids other than water may be employed as glycerine, hydrocarbon oils, etc., so long as the coolant is substantially non-reacting with the particular plastic being drawn. Although liquid coolants are preferred, various gases inert to the plastic being fabricated can be used, particularly when the tubing size is relatively small and the wall thickness not too great. In some operations, especially with such resins as "nylon," steam may be used as a coolant.

Utilization of the invention in the production of tubing that is uniform, strain-free, equally shrunk, and of close tolerance, is readily carried out in the production of extruded tubing, particularly from thermoplastic materials such as the synthetic resinous materials indicated above. Such material as it emerges from the extrusion die is in the form of a more or less molasses-like material that is entirely unself-sustaining and does not become self-sustaining until cooled substantially below the extrusion temperature. By the application of the invention, tubing of uniform, strain-free character is readily produced.

Having thus set forth my invention, I claim:

1. In apparatus for the fabrication of rigid tubing by drawing operations from die extruded hot resinous thermoplastic, in combination, a preliminary draw plate and final draw means spaced therefrom to give the exact external shape desired in the finished tubing, said final draw means including a plate having a pressure exerting face which contacts a portion only of the tube periphery and thereby exerts shaping pressure against only a portion of the tube periphery.

2. In apparatus for the fabrication of rigid tubing by drawing operations from die extruded hot resinous thermoplastic, in combination, a preliminary draw plate and draw means spaced therefrom to give the exact external shape desired in the finished tubing, said final draw means including spaced plates each plate having a pressure exerting face which contacts a portion only of the tube periphery and thereby exerts shaping pressure against only a portion of the tube periphery, the plates conjointly contacting the entire periphery of the tubing.

3. In apparatus for the fabrication of rigid tubing by drawing operations from die extruded hot resinous thermoplastic, in combination, a preliminary draw plate and draw means spaced therefrom to give the exact external shape desired in the finished tubing, said final draw means including spaced plates each plate having a pressure exerting face which contacts a portion only of the tube periphery and thereby exerts shaping pressure against only a portion of the tube periphery, the plates conjointly contacting the entire periphery of the tubing, a line through the first points of contact of any two successive final plates with opposite periheral points of the tubing, forming an angle other than 90° with the line of draw.

4. In apparatus for the fabrication of rigid tubing by drawing operations from die extruded hot resinous thermoplastic, a draw plate having an opening therein through which the die extruded plastic is drawn while hot from the extruding operation, the plate wall adjacent said opening having a sharp acute angled edge for contact with the tubing passing therethrough and means for applying coolant to said tubing immediately in front of said draw plate.

5. In apparatus for the fabrication of rigid tubing by drawing operations from die extruded hot resinous thermoplastic, a draw plate having an opening therein through which the die extruded plastic is drawn while hot from the extruding operation, the plate wall adjacent said opening tapering to form a sharp leading acute angled edge for contact with the tubing passing therethrough and means for applying coolant to said tubing immediately in front of said draw plate.

6. In apparatus for the fabrication of rigid tubing by drawing operations from die extruded hot resinous thermoplastic, in combination, a preliminary draw plate having an opening therein through which the die extruded plastic is drawn while hot from the extruding operation, the plate wall adjacent said opening having a sharp edge for contact with the tubing passing therethrough, and a final draw plate spaced therefrom having an opening to give the exact external shape desired in the finished tubing, the plane of the opening of the final draw plate being at other than a right angle to the line of draw, and means for applying coolant to said tubing immediately in front of said preliminary draw plate.

7. In apparatus for the fabrication of rigid tubing by drawing operations from die extruded hot resinous thermoplastic, in combination, a preliminary draw plate having an opening therein through which the die extruded plastic is drawn while hot from the extruding operation, the plate wall adjacent said opening tapering to form a sharp leading edge for contact with the tubing passing therethrough, and a final draw plate spaced therefrom, said final draw plate having an opening to give the exact external shape desired in the finished tubing, the plane of the opening of the final draw plate being at other than a right angle to the line of draw, and means for applying coolant to said tubing immediately in front of said preliminary draw plate.

8. In apparatus for the fabrication of rigid tubing by drawing operations from die extruded hot resinous thermoplastic, in combination, a preliminary draw plate having an opening therein through which the die extruded plastic is drawn while hot from the extruding operation, the plate wall adjacent said opening having a sharp edge for contact with the tubing passing therethrough and means for supplying coolant adjacent said plate to form a film of coolant between the wall of the plate and the plastic within the opening of the plate, and final draw means spaced therefrom to give the exact external shape desired in the finished tubing, said final draw means including a plate having a pressure exerting face which contacts a portion only of the tube periphery and thereby exerts shaping pressure against only a portion of the tube periphery.

9. In apparatus for the fabrication of rigid tubing by drawing operations from die extruded hot resinous thermoplastic, in combination, a preliminary draw plate having an opening therein through which the die extruded plastic is drawn while hot from the extruding operation, the plate wall adjacent said opening having a sharp edge for contact with the tubing passing therethrough and means for supplying coolant adjacent said plate to form a film of coolant between the wall of the plate and the plastic within the opening of the plate, and final draw means spaced therefrom to give the exact external shape desired in the finished tubing, said final draw means including spaced plates each plate having a pressure exerting face which contacts a portion only of the tube periphery and thereby exerts shaping pressure against only a portion of the tube periphery, the plates conjointly contacting the entire periphery of the tubing.

10. In apparatus for the fabrication of rigid tubing by drawing operations from die extruded hot resinous thermoplastic, in combination, a preliminary draw plate and draw means spaced therefrom to give the exact external shape desired in the finished tubing, said final draw means including a number of sets of draw plates each set including spaced plates each plate having a pressure exerting face which contacts a portion only of the tube periphery and thereby exerts shaping pressure against only a portion of the tube periphery, each set of the plates conjointly contacting the entire periphery of the tubing.

11. In apparatus for the fabrication of rigid tubing by drawing operations from die extruded hot resinous thermoplastic, in combination, a preliminary draw plate having an opening therein through which the die extruded plastic is drawn while hot from the extruding operation, the plate wall adjacent said opening having a sharp edge for contact with the tubing passing therethrough and means for supplying coolant adjacent said plate to form a film of coolant between the wall of the plate and the plastic within the opening of the plate, and final draw means spaced therefrom to give the exact external shape desired in the finished tubing, said final draw means including a number of sets of draw plates each set including spaced plates each plate having a pressure exerting face which contacts a portion only of the tube periphery and thereby exerts shaping pressure against only a portion of the tube periphery, each set of the plates conjointly contacting the entire periphery of the tubing.

12. In a method of fabricating rigid tubing, the steps which include extruding hot resinous thermoplastic tubing having a wall thickness that becomes self-sustaining when cooled, supporting said tubing internally by fluid pressure, and drawing said tubing while still relatively plastic from the extrusion step through final draw means which contacts a portion only of the tube periphery and thereby exerts shaping pressure against only a portion of the tube periphery.

13. In a method of fabricating rigid tubing, the steps which include extruding hot resinous thermoplastic tubing having a wall thickness that becomes self-sustaining when cooled, supporting said tubing internally by fluid pressure, drawing said tubing through draw means which apply shaping pressure peripherally to said tubing along a knife edge, and applying coolant to said tubing immediately prior to its contact with said draw means.

14. In a method of fabricating rigid tubing, the steps which include extruding hot resinous thermoplastic tubing having a wall thickness that becomes self-sustaining when cooled, supporting said tubing internally by fluid pressure, drawing said tubing through preliminary draw means which apply shaping pressure peripherally to said tubing along a knife edge while maintaining a film of coolant between the draw means and the tubing, and drawing said tubing while still relatively plastic from the extrusion step through final draw means which contacts a portion only of the tube periphery and thereby exerts shaping pressure against only a portion of the tube periphery.

15. In a method of fabricating rigid tubing, the steps which include extruding hot resinous thermoplastic tubing having a wall thickness that becomes self-sustaining when cooled, supporting said tubing internally by fluid pressure, and drawing said tubing while still relatively plastic from the extrusion step through final draw means including a number of sets of draw plates each set of which exerts shaping pressure successively at different portions of the tube periphery.

16. In a method of fabricating rigid tubing the steps which include extruding hot resinous thermoplastic tubing having a wall thickness that becomes self-sustaining when cooled, supporting said tubing internally by fluid pressure, and applying shaping pressure at a number of successive stations to said tubing while still relatively plastic from the extrusion step, each station including application of pressure successively at different portions of the tube periphery.

17. Draw means for extruded tubing, said means including at least two plates each plate having an opening to fix a portion only of the contour desired in the final tubing, the plates conjointly fixing the entire periphery desired in the tubing.

CHARLES E. SLAUGHTER.

REFERENCES CITED

The following references are of record in the file of this patent:

UNITED STATES PATENTS

| Number | Name | Date |
|---|---|---|
| 1,679,545 | Roth | Aug. 7, 1928 |
| 2,044,961 | Waner | June 23, 1936 |
| 2,267,488 | Becker | Dec. 23, 1941 |
| 670,611 | Hoffmann | Mar. 26, 1901 |
| 1,766,638 | Howard | June 24, 1930 |
| 2,126,869 | Burchneal | Aug. 16, 1938 |
| 2,168,993 | Joseph | Aug. 8, 1939 |
| 2,287,825 | Postlewaite | June 30, 1942 |
| 2,337,927 | Reichel et al. | Dec. 28, 1943 |
| 2,383,520 | Slaughter | Aug. 28, 1945 |